(12) United States Patent
Czechowski et al.

(10) Patent No.: US 11,262,770 B2
(45) Date of Patent: Mar. 1, 2022

(54) PRESSURE-REGULATING VALVE

(71) Applicant: Goodrich Corporation, Charlotte, NC (US)

(72) Inventors: Kamil Czechowski, Wroclaw (PL); Tomasz Wański, Wroclaw (PL)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 17/064,739

(22) Filed: Oct. 7, 2020

(65) Prior Publication Data
US 2021/0116947 A1    Apr. 22, 2021

(30) Foreign Application Priority Data
Oct. 19, 2019   (EP) .................................. 19461593

(51) Int. Cl.
| | | |
|---|---|---|
| *G05D 16/10* | (2006.01) | |
| *F16K 17/04* | (2006.01) | |
| *B33Y 80/00* | (2015.01) | |

(52) U.S. Cl.
CPC ......... *G05D 16/103* (2013.01); *F16K 17/044* (2013.01); *B33Y 80/00* (2014.12); *Y10T 137/7825* (2015.04)

(58) Field of Classification Search
CPC ........................ Y10T 137/7825; B33Y 80/00
USPC ................................. 267/158, 179; 251/337
See application file for complete search history.

(56) References Cited

U.S. PATENT DOCUMENTS

| | | | | |
|---|---|---|---|---|
| 129,015 | A * | 7/1872 | Fay et al. ................ | F17C 13/04 137/505.35 |
| 2,478,040 | A * | 8/1949 | Campbell, Jr. ..... | G05D 16/0669 137/505.42 |
| 3,747,629 | A * | 7/1973 | Bauman ............. | G05D 16/0661 137/270 |
| 3,825,029 | A * | 7/1974 | Genbauffe ......... | G05D 16/0661 137/271 |
| 3,936,919 | A * | 2/1976 | Genbauffe .............. | B23P 15/00 29/890.124 |
| 4,279,268 | A | 7/1981 | Aubert | |
| 4,333,403 | A * | 6/1982 | Tack ......................... | B61F 5/06 105/197.05 |
| 5,988,204 | A * | 11/1999 | Reinhardt .......... | G05D 16/0661 137/271 |

(Continued)

OTHER PUBLICATIONS

Extended European Search Report for International Application No. 19461593.6 dated Apr. 15, 2020, 9 pages.

*Primary Examiner* — Robert K Arundale
(74) *Attorney, Agent, or Firm* — Cantor Colburn LLP

(57) ABSTRACT

A pressure regulating valve comprises a valve housing comprising a pressure-regulating chamber having an inlet for high pressure fluid and an outlet for pressure-regulated fluid, and a valve element received in the pressure-regulating chamber and movable axially therein for regulating the pressure of the fluid passing from the inlet to the outlet. The valve element comprises a regulating element having a regulator head slidably and sealingly received in the valve housing, the regulating element extending into the regulating chamber, at least one spring, and an adjustment head for adjusting an initial compression of the at least one spring within the regulating chamber. The at least one spring is integrally formed with and extends between the regulator head and the adjustment head.

20 Claims, 5 Drawing Sheets

(56) References Cited

U.S. PATENT DOCUMENTS

| | | |
|---|---|---|
| 10,281,053 B2 | 5/2019 | Griffin, Jr. et al. |
| 2003/0094202 A1 | 5/2003 | Hansen et al. |
| 2007/0215645 A1 | 9/2007 | Clynes et al. |
| 2010/0320660 A1* | 12/2010 | Takeda .................. F16F 1/125 267/168 |
| 2014/0326335 A1 | 11/2014 | Hessling et al. |
| 2015/0107701 A1* | 4/2015 | Kuo ..................... F16K 15/063 137/538 |
| 2017/0156880 A1* | 6/2017 | Halverson ............ A61F 2/0077 |
| 2017/0220055 A1 | 8/2017 | Quaglia et al. |
| 2017/0276173 A1* | 9/2017 | Smedresman ........ F01D 25/164 |
| 2019/0040962 A1 | 2/2019 | Mcdonald |
| 2019/0243394 A1 | 8/2019 | Bartels |
| 2019/0311852 A1* | 10/2019 | Johnson .................. C21D 1/26 |

\* cited by examiner

PRESSURE-REGULATING VALVE

FOREIGN PRIORITY

This application claims priority to European Patent Application No. 19461593.6 filed Oct. 19, 2019, the entire contents of which is incorporated herein by reference.

TECHNICAL FIELD

The present disclosure relates to pressure regulating valves, as may be used for example in inflation systems.

BACKGROUND

A typical pressure regulating valve comprises a valve housing having a regulating chamber which receives a regulating element. The chamber comprises an inlet for high pressure fluid and an outlet for fluid whose pressure has been regulated by the regulating element. The regulating element is resiliently biased within the regulator housing chamber by means of a spring which is mounted between the regulating element and an adjustment element. The spring typically comprises a plurality of Belleville spring washers. In order to achieve the desired outlet pressure, typically regulator output tests are required. This may be time consuming since it may be influenced by many factors such as defects in the Belleville springs, lubricant between the Belleville springs, machining tolerances and so on. Thus, the valve may need to be assembled, tested and disassembled, modified, reassembled and re-tested many times before the appropriate regulating performance is achieved. In addition, during maintenance, it may become necessary to replace the entire Belleville spring set to achieve the desired regulated pressure.

It would therefore be desirable to provide a pressure regulating valve which facilitates manufacture, assembly and testing.

SUMMARY

From a first aspect, the disclosure provides a pressure regulating valve comprising a valve housing and a valve element. The valve housing comprises a pressure-regulating chamber having an inlet for high pressure fluid and an outlet for pressure-regulated fluid. The valve element has a portion received in the pressure-regulating chamber and movable axially therein for regulating the pressure of the fluid passing from the inlet to the outlet. The valve element comprises a regulating element having a regulator head slidably and sealingly received in the valve housing, the regulating element extending into the regulating chamber, at least one spring, and an adjustment head for adjusting an initial compression of the at least one spring within the regulating chamber. The at least one spring is integrally formed with and extends between the regulator head and the adjustment head.

The disclosure also provides a valve element for a pressure-regulating valve, comprising a regulating element having a regulator head slidably and sealingly receivable in a regulating chamber of the pressure-regulating valve, at least one spring, and an adjustment head for adjusting an initial compression of the at least one spring within the regulating chamber. The at least one spring is integrally formed with and extends between the regulator head and the adjustment head.

The at least one spring may comprise a helical spring.

The helical spring may comprise a multi-start helical spring having multiple coils, with one spring coil being arranged in the gap between the turns of another spring coil.

The multi-start helical spring may comprise at least three coils. For example, the multi-start helical spring may comprise six coils.

The at least one spring may comprises a radially outer helical spring and a radially inner helical spring. One or both of the radially outer helical spring and the radially inner helical spring may be multi-start spring as discussed above.

The radially outer helical spring and the radially inner helical spring may be coiled in opposite directions from one another.

The helix angle of the helical spring may be 30 degrees or less.

The regulating element may comprise a poppet for controlling flow of fluid though the pressure regulating chamber.

The valve element may be made from an aluminium alloy.

The adjustment head, the regulator head and the at least one spring may be integrally formed by additive manufacturing.

The disclosure therefore also provides a method of manufacturing a valve element in accordance with the disclosure, comprising additively manufacturing the regulator head, adjustment head and at least one spring integrally using an additive manufacturing process.

The additive manufacturing process may be Selective Laser Melting.

The disclosure also provides a method of assembling a valve in accordance with the disclosure, comprising inserting the valve element into a bore of the valve housing until a distal end of the valve element is received against a stop surface and thereafter moving the adjustment head further into the valve housing to provide a preload on the at last one spring.

BRIEF DESCRIPTION OF THE DRAWINGS

An embodiment of the disclosure will now be described, by way of example only, with reference to the accompanying drawings in which.

DETAILED DESCRIPTION

Figure 1:
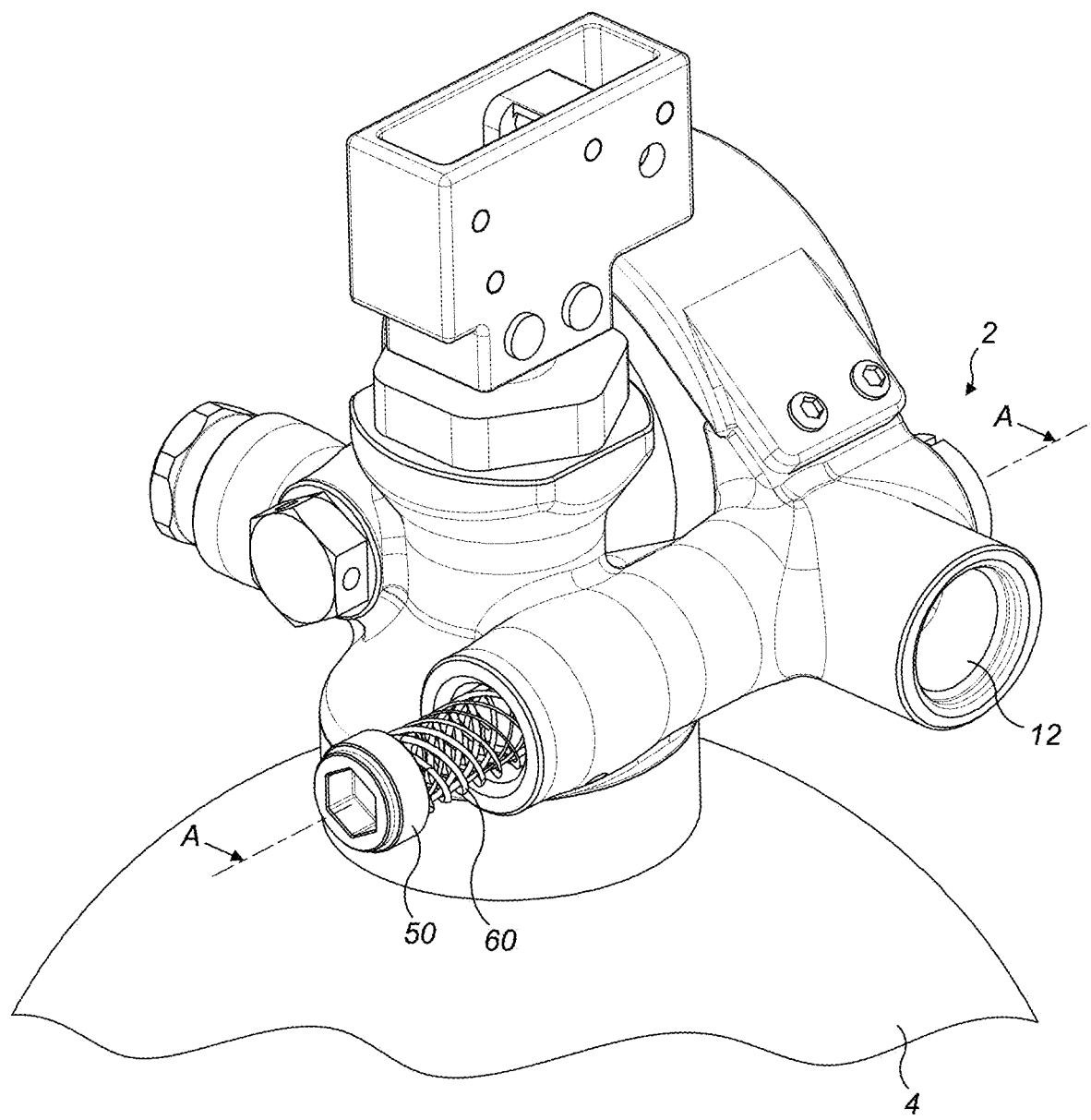
FIG. 1 shows a partially assembled pressure-regulating valve mounted to a high pressure gas canister.

FIG. 1 illustrates a pressure regulating valve 2 mounted to the outlet of a high pressure gas cylinder 4. The pressure-regulating valve 2 regulates the pressure of gas from the gas cylinder 4. A typical application of such a pressure-regulating valve 2 is in inflation systems for aircraft evacuation slides. Typically, the pressure of gas in the cylinder 4 may be of the order of 22.75 MPa (3300 psi) and the pressure required to inflate the slide is of the order of 2.76 MPa (400 psi). The pressure-regulating valve 2 therefore reduces and regulates the pressure of the gas released from the canister.

Figure 2:
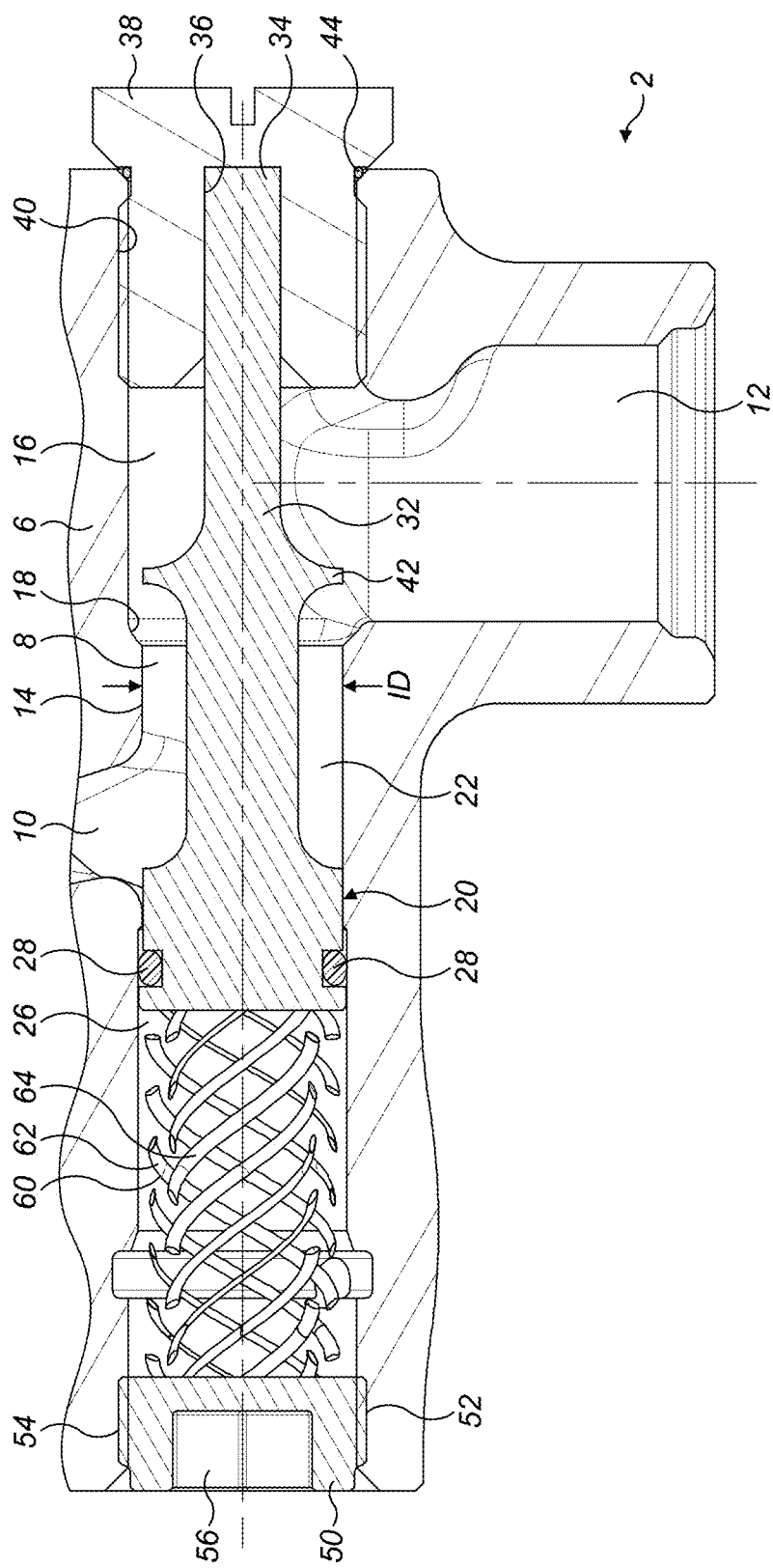
FIG. 2 shows a horizontal cross section along the line A-A of FIG. 1 through the pressure-regulating valve of FIG. 1 in a non-operative condition.

Turning now to FIG. 2, the pressure-regulating valve 2 comprises a housing 6 that defines a pressure-regulating chamber 8. The pressure-regulating chamber 8 has an inlet 10 for receiving high pressure gas from the cylinder 4 and an outlet 12 for pressure-regulated gas. This outlet 12 will be connected by a suitable conduit to the system requiring the supply of regulated gas.

As is known in existing pressure regulating valves, the pressure regulating chamber 8 comprises a bore 14 arranged between the inlet 10 and the outlet 12. The bore opens into an outlet chamber 16 with a chamfered transition section 18.

Figure 3:
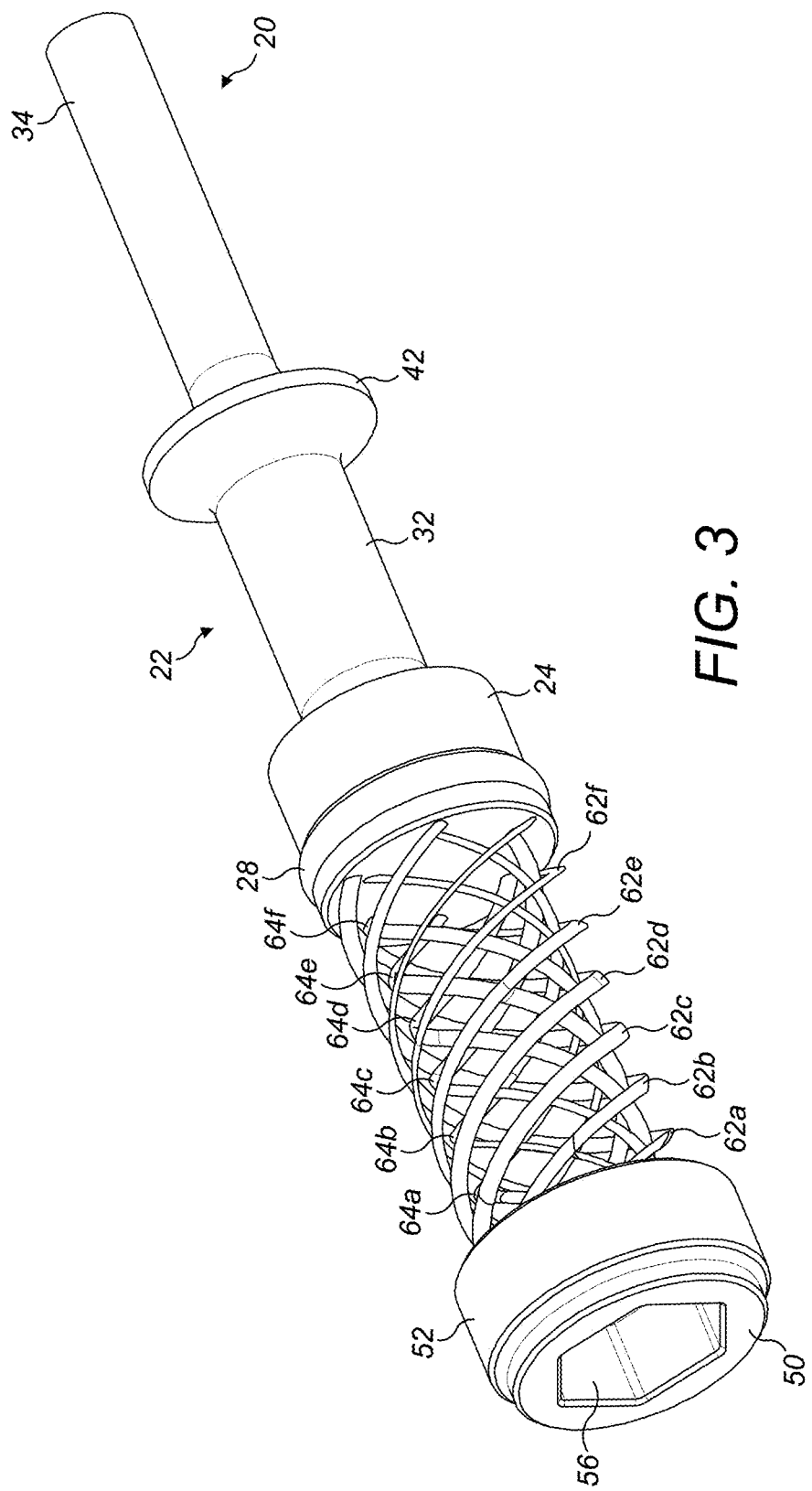
FIG. 3 shows a perspective view of the valve element of the pressure-regulating valve.
Figure 4:
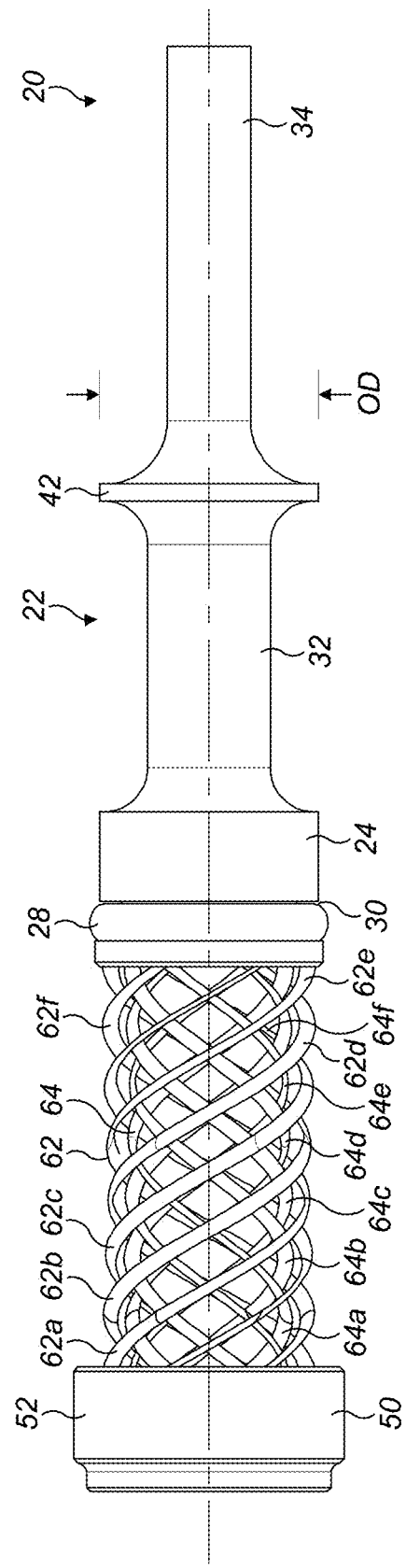
FIG. 4 shows a side elevation of the valve element of FIG. 3.

A valve element 20 is received in the valve housing 6. The valve element 6 is shown in greater detail in FIGS. 3 and 4. The valve element 20 comprises a regulating element 22 having a generally cylindrical regulator head 24 that is slidably and sealingly received in a bore 26 formed in the valve housing 6 and extending into the pressure regulating chamber 8. As illustrated, the regulator head is provided with an O-ring seal 28 in an external groove 30 for making sealing engagement with the valve housing bore 26.

The regulating element 22 comprises a valve shaft 32 which extends through the regulating chamber 8 and outlet chamber 16 and is slidably supported at its distal end 34 in a bore 36 formed in a plug 38 sealingly mounted, for example by screw threading in a bore 40 formed in the valve housing 6. An O-ring or other seal 44 may be provided for sealing purposes. The bore 40 may be coaxial with the bore 26 for ease of manufacture.

The regulating element 22 in this embodiment comprises a poppet element 42 projecting from the valve shaft 32. The outer diameter OD of the poppet element 42 is smaller than the inner diameter ID of the regulating chamber 8 such that the poppet element 42 is able to move axially within the regulating chamber 8, as can be seen from FIG. 4. This arrangement is known from existing pressure-regulating valves.

The valve element 20 further comprises an adjustment head 50 and a spring 60. As will be described further below, the spring 60 is formed integrally with the regulator head 24 and the adjustment head 20 such that the valve element 20 is a one-piece unitary element. This is in contrast to the above mentioned prior art in which the components were formed as separate components. Forming the valve element 20 in this manner facilitates assembly and calibration of the valve 2.

The adjustment head 50 is received in the end of the housing bore 26 and may have an external thread 52 for threaded engagement with an internal thread 54 on the housing bore 26. The adjustment head 50 may also comprise a socket 56 or other formation for receiving a complementary driver for rotating the valve element 20 into the bore 26 during assembly.

The spring 60 in this embodiment comprises a plurality of springs. This is advantageous as it allows a suitable spring force to be provided without the need for a single, high stiffness spring, whose manufacture may be difficult. Of course, it is within the scope of the disclosure to provide a single spring As illustrated in this embodiment, the spring 60 may comprise a radially outer spring 62 and a radially inner spring 64 received within the radially outer spring 62. This is advantageous as it facilitates arrangement of the springs to provide the requisite spring force within a confined space while using simple spring designs. The radially inner spring 62 and the radially outer spring 64 may be coaxial with one another, as illustrated so as provide axially aligned spring forces.

As illustrated in this embodiment, the radially outer spring 62 and the radially inner spring 64 may be helical springs. The cross sectional shape of the springs may be circular, oval or any other suitable shape to develop the necessary spring force.

As illustrated in this embodiment, one of, or both the radially outer spring 62 and the radially inner spring 64 may be multi-start helical springs. A multi-start spring is one that comprises a plurality of coils, with one coil being arranged within the gap between the turns of the other coils. In this embodiment, the radially outer spring 62 comprises six coils 62a, 62b, 62c, 62d, 62e, 62f and the radially inner spring 64 comprises three coils 64a, 64b, 64c, 64d, 64e, 64f. Of course, each spring 62, 64 may comprise other numbers of coils. For example each spring 62, 64 may comprise three, four or five springs for example. In addition, the springs 62, 64 may comprise the same number of coils as each other or a different number of coils from each other. The precise number of coils may be chosen to achieve the necessary spring force. As can be seen from FIG. 3, the spring coils are connected to the regulator head 24 at a generally constant circumferential spacing, in this embodiment at 60 degrees from one another. The coils may be connected to the adjuster head 50 in a similar manner, i.e. at a regular circumferential spacing.

As illustrated in this embodiment, the radially outer spring 62 and the radially inner spring 64 may be coiled in different directions from one another. This is advantageous in that it mitigates rotation of the regulator head 24 and thus the regulator element 22 as the regulator head 24 move axially in the housing bore 26. In addition, it assists in providing rotational stiffness, which is desirable during installation of the valve element 20.

Of course, in other embodiments, the radially outer spring 62 and the radially inner spring 64 may coil in the same direction.

As discussed above, the valve element 20 is made as a unitary one-piece component. This may be achieved in any suitable manner; however using an additive manufacturing technique is preferred. Additive manufacturing is a technique in which layers of material are deposited on one another to build up a three dimensional shape. A number of techniques are known, and the particular technique used may depend, for example, on the materials being used. For a typical pressure-regulating valve, the valve element 20 may be metallic, for example of aluminium or aluminium alloy. Suitable techniques for additive manufacturing of such materials include Selective Laser Melting as an example.

To assist in the additive manufacture of the valve element, the helix angle of the radially outer spring 62 and radially inner spring 64 may be relatively high, to avoid the need for additional supports in the additive manufacturing process. Thus in some embodiments the helix angle of the springs 62, 64 may be 30 degrees or higher.

Having described the construction of the pressure-regulating valve 2, its assembly and operation will now be described.

To assemble the pressure-regulating valve 2, tall that is required is that the valve element 20 is inserted into the valve housing bore 26. Pre-fabricating the valve element 20 avoids the need to assemble a regulating element, spring and adjustment head in situ. In addition, as the valve element is prefabricated, it may be tested prior to assembly to ensure that it provides the necessary spring force for regulation.

The valve element 20 is then inserted, in this embodiment screwed, into the valve housing bore 26 until the distal end 34 of the valve shaft 32 bottoms out on a stop surface 70 at the base of the plug bore 36, such that the poppet element 42 is arranged in the correct rest position as shown in FIG. 2. An appropriate preload on the spring 60 is achieved by appropriately positioning the adjustment head 50 in the housing bore 26. As the adjustment head 50 continues to move into the housing bore 26 after the distal end 34 of the valve element has bottomed out in the plug bore 36, a preload will be applied to the spring 60. When the adjustment head 50 reaches a position, where the desired spring preload is provided, it may be retained in that position by any suitable means. As the spring characteristics of the valve element 32 can be tested prior to its insertion into the valve bore 26, the positioning of the adjustment head 50 to provide the desired preload can be facilitated.

Figure 5:
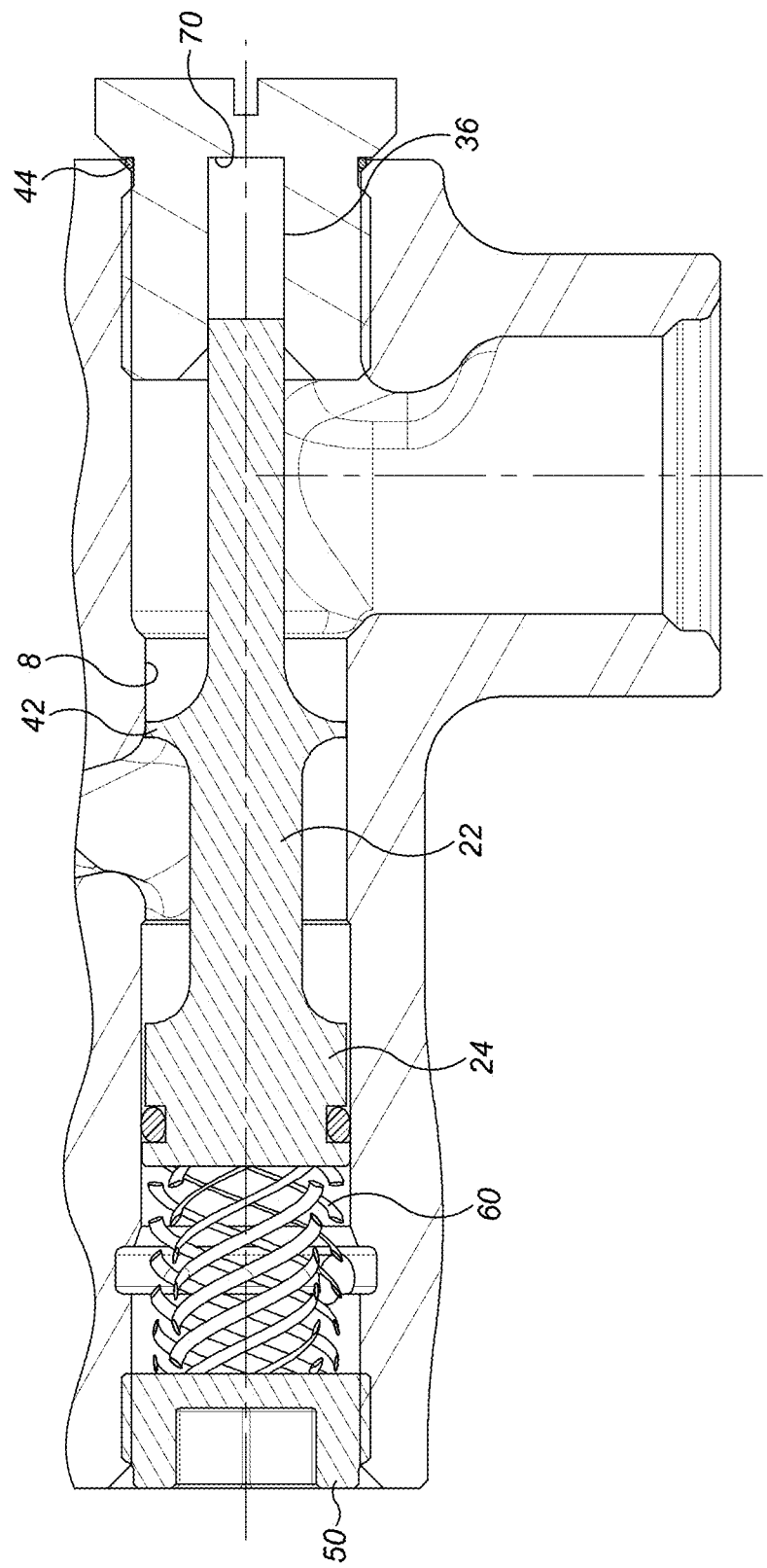
FIG. 5 shows a horizontal cross section through the valve in a regulating position.

During use, high pressure gas from the inlet 10 will, in a known manner, act upon the regulating element 22, moving the it to the left in the sense of the Figures against the force of the spring 60, to a position such as that illustrated in FIG. 5. During regulation, the poppet element 42 interacts with the walls of the regulating chamber 8 to provide a regulating flow passage for the gas to the outlet 12, in a known manner. As the inlet pressure drops, the regulating element 22 will move back to the right under the force of the spring 60 towards the rest position shown in FIG. 1, the interaction between the poppet element 42 and the walls of the regulating chamber 8 regulating the gas pressure in a known manner.

From the above description, it will be seen that the disclosure provides a pressure-regulating valve 2 that is easy to assemble and calibrate. The one piece, unitary construction of the valve element 20 allows its spring force to be accurately determined prior to assembly. Moreover, the helical spring arrangement reduces the amount of lubricant required compared to constructions using Belleville washers, thereby reducing the effect of lubricant on the operation of the valve. In addition the use of a unitary valve element may significantly reduce the cost of the valve, as compared to the known multi-piece construction.

While nested radially inner and outer springs 64, 62 are illustrated, other spring configurations could be provided.

It is also envisaged that a range of valve elements 20 could be manufactured, each providing a desired spring force and characteristic. This would allow various outlet pressures to be provided in a simple and cost-effective manner.

While the pressure-regulating valve has been described as having application in inflation systems, it may of course find application in other systems.

The invention claimed is:

1. A pressure regulating valve comprising:
a valve housing comprising a pressure-regulating chamber having an inlet for high pressure fluid and an outlet for pressure-regulated fluid;
a valve element having a portion received in the pressure-regulating chamber and movable axially therein for regulating the pressure of the fluid passing from the inlet to the outlet;
the valve element comprising:
a regulating element having a regulator head slidably and sealingly received in the valve housing, the regulating element extending into the regulating chamber;
at least one spring; and
an adjustment head for adjusting an initial compression of the at least one spring within the regulating chamber;
wherein the at least one spring is integrally formed with and extends between the regulator head and the adjustment head.

2. A valve as claimed in claim 1, wherein the at least one spring comprises a helical spring.

3. A valve as claimed in claim 2, wherein the helical spring comprises a multi-start helical spring having multiple coils, with one spring coil being arranged in the gap between the turns of another spring coil.

4. A valve as claimed in claim 3, wherein the multi-start helical spring comprises at least three coils.

5. A valve as claimed in claim 4, wherein the multi-start helical spring comprises six coils.

6. A valve as claimed in claim 1, wherein the at least one spring comprises a radially outer helical spring and a radially inner helical spring.

7. A valve as claimed in claim 6, wherein the radially outer helical spring and the radially inner helical spring are coiled in opposite directions from one another.

8. A valve as claimed in claim 2, wherein the helix angle of the helical spring is 30 degrees or less.

9. A valve as claimed in claim 1, wherein the regulating element comprises a poppet for controlling flow of fluid though the pressure regulating chamber.

10. A valve as claimed in claim 1, wherein the valve element is made from an aluminium alloy.

11. A valve as claimed claim 1, wherein the adjustment head, the regulator head and the at least one spring are integrally formed by additive manufacturing.

12. A valve element for a pressure-regulating valve, the valve element comprising:
a regulating element having a regulator head slidably and sealingly receivable in a regulating chamber of the pressure-regulating valve;
at least one spring; and
an adjustment head for adjusting an initial compression of the at least one spring within the regulating chamber;
wherein the at least one spring is integrally formed with and extends between the regulator head and the adjustment head.

13. A valve element as claimed in claim 11, wherein the at least one spring comprises a helical spring.

14. A valve element as claimed in claim 13, wherein the helical spring comprises a multi-start helical spring having multiple coils, with one spring coil being arranged in the gap between the turns of another spring coil.

15. A valve element as claimed in claim 14, wherein the multi-start helical spring comprises at least three coils.

16. A valve element as claimed in claim 12, wherein the at least one spring comprises a radially outer helical spring and a radially inner helical spring.

17. A valve element as claimed in claim 16, wherein the radially outer helical spring and the radially inner helical spring are coiled in opposite directions from one another.

18. A valve as claimed in claim 2, wherein the helix angle of the helical spring is 30 degrees or less.

19. A valve as claimed in claim 1, wherein the regulating element comprises a poppet for controlling flow of fluid though the pressure regulating chamber.

20. A method of manufacturing a valve element as claimed in claim 12, comprising:
additively manufacturing the regulator head, the adjustment head and at least one spring integrally using an additive manufacturing process.

* * * * *